Figure 1:
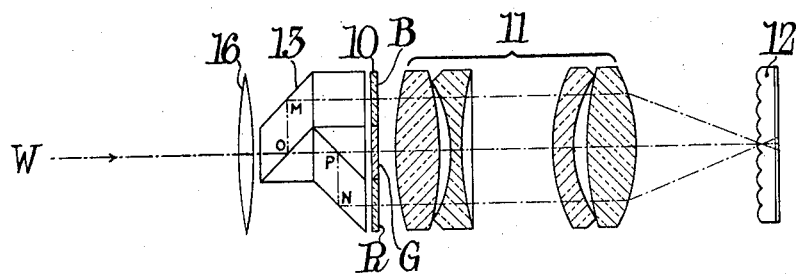

June 15, 1943.   J. G. CAPSTAFF   2,321,993

METHOD AND OPTICAL SYSTEM FOR COLOR PROCESSES

Filed Dec. 20, 1933

John G. Capstaff,
Inventor;

Patented June 15, 1943

2,321,993

UNITED STATES PATENT OFFICE 2,321,993

METHOD AND OPTICAL SYSTEM FOR COLOR PROCESSES

John G. Capstaff, Rochester, N. Y., assignor, by mesne assignments, to Eastman Kodak Company, Rochester, N. Y., a corporation of New Jersey Application December 20, 1933, Serial No. 703,268

12 Claims. (Cl. 88—16.4)

This invention relates to photographic color processes and more particularly to the type of process disclosed in the patent to Berthon No. 992,151, May 16, 1911, in which a filter with color bands is placed at the objective and the exposure is made on a sensitive layer on the rear side of a support having minute lens elements upon its front surface.

In projecting pictures made on lenticular film in accordance with this process a serious defect becomes apparent in the form of color fringes on out-of-focus objects and is particularly serious in close-up objects. Such color fringing limits the depth of field and correspondingly limits the usefulness of the process.

I have found that the chief cause of this objectionable color fringing is due to stereo-parallax which arises from the fact that the three color filter strips normally see the subject from different view points and propose to eliminate this defect by employing, in taking, a single beam of light for forming the color separation images. This may be accomplished by positioning a beam splitter of any suitable type in front of the banded filters and the camera lens to separate a single beam into as many parts as there are filter bands. Each separated part is then passed through its appropriate filter and thence through the camera lens to form images which are free from the parallax defect.

It has been observed in practice that the color fringing is ordinarily much more noticeable between the red and the green filter images than between the blue and the green; accordingly, for light economy reasons, satisfactory results may be obtained in most instances by ignoring the blue-green parallax and eliminating only the red-green parallax.

Figure 2:
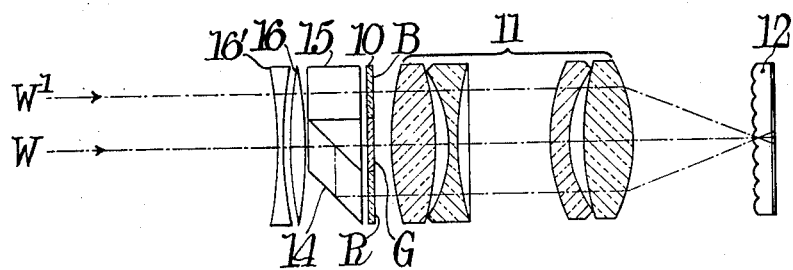

Objects and advantages other than those above recited will appear from the following description wherein reference is made to the accompanying drawing in the two figures of which like reference characters indicate like elements, and in which:

Fig. 1 is a diagrammatic section showing one form of my invention as applied to a camera optical system; and Fig. 2 is a diagram illustrating my invention as applied to the elimination of parallax for two colors only.

A camera optical system to which my invention may be applied is shown in Fig. 1 as comprising a banded filter 10 positioned in front of an objective 11 which is adapted to form an image on a lenticulated film 12 and in the plane containing the Gauss points of the lenticular lens elements as is fully disclosed in United States Patent No. 1,685,600 to Frederick. The filter 10 is shown as having the usual three bands, R, G and B, red, green and blue respectively and is positioned at the point specified in said Frederick patent.

A suitable beam splitter 13 positioned in front of the filter 10 is adapted to divide a beam W of white light as follows: The beam W is first split into two beams, WOP and WOM, at the partly transparent mirror O. The beam WOM is directed by the reflecting surface M through the blue filter band B. The beam WOP is again split into two parts at the transparent mirror P, one part continuing directly to the green filter band G and the other part being directed by the surface N to the red filter band R. By this arrangement a single original beam is divided into three parts each of which is directed through its appropriate filter and imaged by the lens 11 on the film 12 and accordingly such images are free from the parallax defect.

Pictures produced by the above method are free from parallax and upon projection are entirely free from color fringing on out-of-focus objects only when the lens is focussed on infinity. In order to bring objects at a finite distance into focus, it is necessary that a collimating lens 16 be positioned in front of the beam splitter 13 to render substantially parallel the light coming from the object and passing through the beam splitter 13. For photographing objects at different distances, a series of separate spectacle lenses may be provided so that the operator may select different ones for different object distances.

Instead of using a series of simple lenses, the collimating lens 16 may be made focusable, as shown in Fig. 2, by adding a negative lens 16' either in front of or behind the lens 16. This additional lens makes it possible to focus the system for any desired object distance.

In general, it has been observed that the most objectionable color fringing takes place between the red and the green and that if this is eliminated the blue-green fringing can in most cases be tolerated. If it is desired for light economy or other reasons to ignore the blue-green parallax, a simple beam splitting arrangement may be employed. One suitable arrangement is shown in Fig. 2, as comprising a simple beam splitter 14 for dividing the beam W of white light into two parts, one of which passes directly through the green filter band G and the other is directed through the red filter band R. A second beam W' of white light passes directly through the blue filter band B and may or may not be compelled to pass through a plane glass plate 15 which may or may not be added to the beam splitter 14 for simplifying assembly and mounting. It is understood that the area, density and light absorption properties of the several filter bands are properly selected in accordance with the requirements of the process.

It will be understood by those skilled in the art that the arrangements shown in the drawing are largely diagrammatic to aid in disclosing the principles of the invention and that practical structures can readily be supplied, without experimentation, for practicing the invention. If desired, any well known means may be employed to compensate for the inequality of the optical paths through the beam splitter.

The beam splitters shown are well known in the photographic art and the present invention contemplates the use of no special type of beam splitter since numerous ways of practicing the invention will suggest themselves without departing from the scope of the invention as set forth in the appended claims.

What I claim as new and desire to secure by Letters Patent of the United States is:

1. The method of producing lenticular photographic originals which comprises collecting a single beam of light reflected by the object to be taken, dividing the single beam of light into a plurality of separate beams, filtering each separate beam of light, and directing all of the filtered beams through an image forming objective to a lenticular film.

2. The method of producing lenticular photographic originals which comprises collecting a single beam of light reflected by the object to be taken, dividing the single beam of light into a plurality of separate beams, filtering each separate beam of light, and using all of said filtered beams to form in the plane containing the Gauss points of the lens elements of a lenticular film a single image of the object to be taken.

3. An optical combination comprising an objective adapted for use for goffered films in color photography, a color selecting screen in front of said objective and having a plurality of different filter elements, and a beam splitter having a light dividing surface and reflecting surface in optical alinement with two adjacent filter elements respectively.

4. An optical system for use in a color photographic process for taking pictures on goffered film and comprising an objective, a three color banded filter in front of the objective, and means in front of said filter for dividing a single beam of light into at least two beams and directing the divided beams through different bands of said filter.

5. An optical system for use in a color photographic process for taking pictures on a photographic layer having associated therewith minute lens elements, comprising an objective, a banded color filter in front of the objective, a beam splitter for dividing a single beam of light into at least two beams and directing each divided beam through a single filter band, and a lens in front of the beam splitter for collimating the light passing through said beam splitter and said color filter.

6. An optical system for taking pictures on lenticular film comprising a banded color filter, an objective for imaging the light transmitted by the filter, means for dividing a single beam of light into a plurality of beams and directing each divided beam through a separate band of the filter, and a collimating lens of adjustable focus in the single beam of light in front of said dividing means.

7. An optical system for forming on lenticular film color separation images of an object field which are substantially free from parallax, comprising a lens for collimating light reflected by the object field, a beam splitter in the collimated light for dividing a single beam into a plurality of beams of light, a color filter in each divided beam, and an objective positioned to receive the divided beams after they have passed through their respective filters.

8. The method of producing lenticular photographic originals which are free from parallax which comprises collecting and collimating a single beam of light reflected by the object to be photographed, dividing the single collimated beam into several separate beams, removing from each separate beam all light of certain predetermined wave lengths and then collecting all of the separate beams by means of an image forming objective.

9. An optical system for use in a color photographic process for taking pictures on a photographic layer having associated therewith minute cylindrical lens elements, comprising an objective, a color screen in front of the objective, said screen consisting of red, green and blue filter sections arranged side by side and parallel to the cylindrical lens elements on the film to be used, a beam splitter in front of the red and green sections for dividing a single beam of light into two beams and directing one of the divided beams through the red filter section while transmitting the other divided beam to the green filter section, and a lens in front of the beam splitter for collimating the light passing through said beam splitter.

10. An optical system for forming on lenticular film color separation images of an object field which are substantially free from parallax, comprising a lens for collimating light reflected by the object field, a beam splitter in the collimated light for dividing a single beam into two beams of light, a red color filter in one of the divided beams, a green color filter in the other divided beam, a blue color filter positioned to one side of the beam splitter and in the collimated light, and an objective positioned to receive the light passed through all three color filters.

11. In an apparatus for photographing an image upon a lenticulated film by passing light to the film through a color filter having a plurality of zones of different color values, a lens to receive light from the object to be photographed, means to divide said light into the same number of beams as there are zones in said filter and to direct said beams through said filter with each beam passing through only one of said zones, and means to focus said beams into a single image upon the film after they have passed through the filter.

12. The method of photographing an object upon a lenticulated film which comprises collecting light from said object and separating it into a plurality of beams, filtering said beams to produce differing color values whose sum gives substantially the effect of white light, and focusing said beams into a single image upon said film.

JOHN G. CAPSTAFF.